Patented July 1, 1947

2,423,089

UNITED STATES PATENT OFFICE 2,423,089

PROCESS FOR THE MANUFACTURE OF PHENYL AND SUBSTITUTED PHENYL ACRYLATES AND THEIR POLYMERS

Edward M. Filachione, Philadelphia, and Charles H. Fisher, Abington, Pa., assignors to United States of America, as represented by the Secretary of Agriculture No Drawing. Application December 10, 1943, Serial No. 513,742

4 Claims. (Cl. 260—479)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the the preparation of phenyl and substituted phenyl acrylates and polymers and interpolymers thereof.

An object of our invention is the preparation of aryl and substituted aryl acrylates, such as phenyl or tolyl acrylate of relatively high molecular weight and low vapor pressure, some of which are hitherto unknown polymerizable compounds.

A further object is the provision of a new and advantageous method of preparing phenyl and substituted phenyl acrylates.

Polymers and copolymers of phenyl and substituted phenyl acrylates have in a controllable degree the properties of fluidity, elasticity, plasticity, tensile strength, electrical resistance, resistance to water, organic liquids and gases, transparency, and so forth, which are properties highly desirable in the group of substances commonly designated as plastics. Also, the phenyl and substituted phenyl acrylates are particularly valuable in that they can be used with other unsaturated monomers to prepare copolymers having various desirable properties.

It is known that unsaturated hydrocarbons may be produced by the elimination of acetic acid from the acetylated alcohol. For example, 2,4-dimethyl pentene-2 is produced by the pyrolysis of acetylated 2,4-dimethyl pentanol-3 (Van Pelt and Wibaut, Rec. trav. chim. 57, 1055 (1938), 60, 55–64 (1941); Stevens and Richmond, J. Am. Chem. Soc. 63, 3132–6 (1941)). It is also known that unsaturated acids may be formed by the pyrolysis of the acetylated derivatives of polycarboxylic acids. For example, aconitic ester is produced by pyrolysis of the acetylated citric ester, and maleic anhydride is produced by the pyrolysis of acetylated malic anhydride. (Hurd, "Pyrolysis of Carbon Compounds," A. C. S. Monograph 50, New York, Reinhold Publishing Corp., 1929). Further, it is known that the acetylated methyl ester of lactic acid on pyrolysis produces methyl acrylate, but the ethyl ester and higher alkyl esters tend to undergo pyrolytic decomposition with the formation of an unsaturated hydrocarbon and the corresponding acid (Burns, Jones, & Ritchie, J. Chem. Soc. 1935, 400–6, 714–7; U. S. 2,183,357, Dec. 12, 1939; Smith, Fisher, Ratchford, and Fein, Ind. Eng. Chem. 34, 473–479 (1942); Claborn, U. S. 2,222,363, Nov. 19, 1940; U. S. 2,229,997, Jan. 28, 1941). This tendency increases as the molecular weight of the alkyl group increases. Thus, the preparation of acrylic esters by the pyrolysis of lactic esters has been limited, and in most instances it has not been feasible to make acrylic esters of high molecular weight in this manner.

We have found that the presence of a phenyl or substituted phenyl group in place of the alkyl group in the acetyl lactic ester (as shown below)

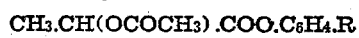

$CH_3.CH(OCOCH_3).COO.C_6H_4.R$ (where R is hydrogen or an alkyl radical) decreases the undesirable side reactions encountered in pyrolysis of the alkyl alpha-acetoxypropionates of higher molecular weight, and that, owing to the unusual stability of the phenyl and substituted phenyl radicals and their esters, their alpha-acetoxypropionates can be converted readily and in high yields into the phenyl and substituted phenyl acrylates, as shown below:

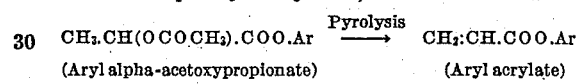

$CH_3.CH(OCOCH_3).COO.Ar \xrightarrow{\text{Pyrolysis}} CH_2{:}CH.COO.Ar$ (Aryl alpha-acetoxypropionate)    (Aryl acrylate)

where Ar is an aryl radical.

Transformation of phenyl or substituted phenyl alpha-acetoxypropionates into the corresponding acrylates is effected conveniently by passing vapors of the alpha-acetoxypropionate through a pyrolysis tube, usually packed in the heated zone with quartz chips or similar contact material maintained at 400° to 600° C. Below 400° C. the conversion is slow, whereas at temperatures above 600° C. excessive decomposition into undesired by-products occurs. Although the examples given below mention only the acetyl derivatives of phenyl and substituted phenyl lactates, other similar derivatives, such as the propionyl and benzoyl derivatives (propionates, benzoates), may also be used.

By way of illustration, our process comprises:
(1) The conversion of lactic acid into alpha-acetoxypropionic acid, alpha-acetoxypropionyl chloride, or alpha-acetoxypropionic anhydride in accordance with the reactions:

(a) CH₃.CHOH.COOH + CH₃COOH ⟶

(Lactic acid)

CH₃.CH(OCOCH₃).COOH + H₂O (Alpha-acetoxypropionic acid)

(b) CH₃.CH(OCOOCH₃).COOH + PCl₃ ⟶

(Alpha-acetoxypropionic acid)

CH₃.CH(OCOCH₃).COCl (Alpha-acetoxypropionyl chloride)

(c) CH₃.CH(OCOCH₃).COOH + CH₂:CO ⟶

(Alpha-acetoxypropionic Ketene acid)

[CH₃.CH(OCOCH₃).CO]₂O (Alpha-acetoxypropionic anhydride)

(2) The preparation of aryl alpha-acetoxypropionate by reaction of alpha-acetoxypropionyl chloride or alpha-acetoxypropionic anhydride with a phenol:

(a) CH₃.CH(OCOCH₃).COCl + ArOH ⟶
CH₃.CH(OCOCH₃).COO.Ar + HCl (b) [CH₃.CH(OCOCH₃).CO]₂O + ArOH ⟶

CH₃.CH(OCOCH₃).COO.Ar + CH₃.CH(OCOCH₃).COOH or by ester interchange between alpha-acetoxypropionic acid and an aryl ester, such as the acetates of the phenols:

(c) CH₃.CH(OCOCH₃).COOH + RCOOAr ⟶
CH₃.CH(OCOCH₃).COO.Ar + RCOOH where R is hydrogen or an alkyl radical and Ar is an aryl radical.

(3) The conversion of phenyl or substituted phenyl alpha-acetoxypropionate into phenyl or substituted phenyl acrylate and acetic acid by means of pyrolytic decomposition, in accordance with the reaction:

CH₃.CH(OCOCH₃).COO.Ar ⟶
CH₂:CH.COO.Ar + CH₃COOH where Ar is an aryl radical (4) The conversion of phenyl or substituted phenyl acrylate into polymers and copolymers of more or less complexity and magnitude by means of heat or other aids to polymerization.

The substances formed as intermediates under step (2) above are the subject of a copending application for patent.

The following examples describe in detail a preferred procedure for making the acrylates mentioned above and their polymers:

*Example I*

Phenyl alpha-acetoxypropionate (116 g.), prepared according to the methods described above, was allowed to run at an approximate rate of 3.2 cc. per minute (contact time approximately 11 seconds) into a Pyrex tube 30 mm. internal diameter and heated over a length of 13 inches. The tube was heated by an electric furnace and the temperature was controlled automatically. The average temperature was 532° C. The apparatus was swept out with nitrogen before the pyrolysis was started and also after all of the liquid had been added. A small amount of hydroquinone was added to the condensate to prevent premature polymerization. The crude pyrolysis product consisted of 110 g., which by titration was shown to contain 0.29 mole of acetic acid. The crude pyrolysis product was then distilled at a pressure of approximately 10 mm. of mercury.

An approximately 3 percent yield of styrene was isolated from the acetic acid fraction. The phenyl acrylate (34.8 g.), which was collected at 83° to 93° C. at 9–11 mm., was yellow or amber. Some of the starting material (51.8 g. of phenyl alpha-acetoxypropionate) was also recovered boiling at 135° to 142° C. at 11 mm. The yield of phenyl acrylate based on the 64 g. of starting material destroyed was 76 percent of the theoretical, the yield of acetic acid was 94 percent. The gaseous products of pyrolysis were principally carbon monoxide and carbon dioxide.

A purified sample of phenyl acrylate was found to boil at 64° to 65° C. at 2 mm., and to have a refractive index (D line) of 1.5216 at 20° C., and a density of 1.0762 at 20° C.

*Example II* o-Tolyl alpha-acetoxypropionate, prepared according to the methods described above, was pyrolyzed in essentially the same equipment as described in Example I. When 49.4 g. of o-tolyl alpha-acetoxypropionate was pyrolyzed in a tube, packed with Pyrex glass, at 500° C. at an average rate of approximately 15 drops per minute (contact time approximately 15 seconds), there was obtained 46.7 g. of liquid products. Distillation of the pyrolysis product gave 15.7 g. of o-tolyl acrylate boiling at 58° to 64° C. at approximately 0.5 mm., and 19.4 g. of unchanged starting material. The yield of o-tolyl acrylate based on the o-tolyl alpha-acetoxypropionate decomposed was 72 percent.

A purified sample of o-tolyl acrylate was found to boil at 58° to 59° C. at 0.5 mm., and to have an index ($n_D$ at 20° C.) of 1.5160. The density at 20° C. was 1.050.

*Example III*

Phenyl acrylate obtained by distillation of the pyrolysis product of phenyl alpha-acetoxypropionate apparently contains small amounts of an inhibitor and when a sample of this phenyl acrylate was heated with 1 percent by weight of benzoyl peroxide at 75° C. did not show any signs of polymerizing. However, when the phenyl acrylate is washed with cold dilute alkali (5 percent sodium hydroxide), the inhibitor is effectively removed. Thus, a sample of phenyl acrylate, which had been purified by washing with cold dilute sodium hydroxide, when heated with 1 percent of its weight of benzoyl peroxide at 75° C., changed to a soft polymer after 15 minutes. After heating overnight the polymer was soft at 100° C. but hard at room temperature.

*Example IV*

Redistilled o-tolyl acrylate, obtained from pyrolysis of o-tolyl alpha-acetoxypropionate, polymerized to a soft polymer when heated at 65° C. with 2 percent by weight of benzoyl peroxide. However, when the o-tolyl acrylate was washed with cold dilute alkali, the polymerization proceeded much more readily even with 1 percent benzoyl peroxide and produced a hard and virtually colorless polymer. The polymerized o-tolyl acrylate was hard at room temperature but soft and somewhat elastic at 65° C.

*Example V*

Phenyl alpha-acetoxypropionate was pyrolyzed in essentially the same equipment as described in Example I with the modification that the pyrolysis tube was operated under a pressure of 18–19 mm. of mercury and the feed was vaporized in a preheater at 220° C. prior to introduction into the furnace. Thus, at 541° C. when the phenyl alpha-acetoxypropionate (78.9 g.) was added over a period of 2.5 hours (contact time 0.77 second), there was obtained 78.3 g. (99.5 percent recovery) of liquid products.

Distillation of the liquid products gave 15.1 g. of phenyl acrylate, collected at 38° to 40° C. at a pressure of 0.3 mm. of mercury, and which was substantially colorless. Undecomposed phenyl alpha-acetoxypropionate, 52 g., was also obtained. The yield of phenyl acrylate, based on the phenyl alpha-acetoxypropionate decomposed, was 80 percent.

It will be apparent to those skilled in the art that various modifications may be employed in carrying out our invention. For example, lactic acid may be converted into alpha-acetoxypropionic acid by treatment with acetyl chloride, ketene or acetic anhydride. Moreover, alpha-acetoxypropionic acid may be converted into the corresponding acid chloride by treatment with various reagents, such as phosphorous chlorides or thionyl chloride. Ketene or acid anhydrides, such as acetic anhydride, may be used to convert alpha-acetoxypropionic acid into alpha-acetoxypropionic anhydride, or alpha-acetoxypropionic acetic anhydride; either anhydride may be treated with phenol or a substituted phenol to form the corresponding phenyl ester. Moreover, beta-hydroxypropionic acid and its derivatives may be used by the methods of our invention to make various aryl acrylates.

Having thus described our invention, we claim:

1. The process of preparing aryl acrylates which comprises pyrolyzing the corresponding aryl ester of alpha-acetoxypropionic acid at a temperature of about 400° to 600° C. for such time as required to produce the desired aryl acrylate.

2. The process of preparing phenyl acrylate which comprises pyrolyzing phenyl alpha-acetoxypropionate at a temperature of about 400° to 600° C. for such time as required to produce the phenyl acrylate.

3. The process of preparing ortho-tolyl acrylate which comprises pyrolyzing ortho-tolyl alpha-acetoxypropionate at a temperature of about 400° to 600° C.

4. Ortho-tolyl acrylate, represented by the formula:

$$CH_2:CH.COO.C_6H_4.CH_3(o-)$$

EDWARD M. FILACHIONE.
CHARLES H. FISHER.

REFERENCES CITED

The following references are of record in the file of this patent:

UNITED STATES PATENTS

| Number | Name | Date |
|---|---|---|
| 2,183,357 | Ritchie et al. | Dec. 12, 1939 |
| 2,200,709 | Trommsdorff | May 14, 1940 |

OTHER REFERENCES

Du Pont, article in Ind. Eng. Chem., vol. 28, pp. 1160–1163 (1936).

Burns et al., article in Jour. Chem. Soc. (London), 1935, pp. 400–406, 260–486.

C. Hurd, Pyrolysis of Carbon Compounds, p. 532, pub. by Chemical Catalog Co., N. Y., 1929.